US012804402B2

(12) United States Patent
Narula et al.

(10) Patent No.: US 12,804,402 B2
(45) Date of Patent: Nov. 17, 2026

(54) SYSTEMS AND METHODS FOR SECURE PAIRING AND COMMUNICATION BETWEEN DEVICES

(71) Applicant: Dell Products L.P., Round Rock, TX (US)

(72) Inventors: Harpreet S. Narula, Austin, TX (US); Todd D. Grabbe, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 51 days.

(21) Appl. No.: 18/914,457

(22) Filed: Oct. 14, 2024

(65) Prior Publication Data

US 2026/0107148 A1 Apr. 16, 2026

(51) Int. Cl.
*H04W 12/50* (2021.01)

(52) U.S. Cl.
CPC .................................. *H04W 12/50* (2021.01)

(58) Field of Classification Search
None
See application file for complete search history.

(56) References Cited

U.S. PATENT DOCUMENTS

2020/0059784 A1* 2/2020 Batra .................... H04L 9/3271
2021/0076202 A1* 3/2021 Park ....................... H04W 76/11
2024/0251363 A1* 7/2024 Liu ...................... H04W 56/001
2025/0168880 A1* 5/2025 Mysore ................. H04W 74/04
2025/0267458 A1* 8/2025 Reddy ................. H04W 12/104

FOREIGN PATENT DOCUMENTS

TW 202439838 A * 10/2024 .......... H04W 64/006
WO WO-2022102139 A1 * 5/2022 ............ G06Q 30/06

OTHER PUBLICATIONS

Woolley, Bluetooth Core 5.4 Technical Overview, 2025, pp. 1-43. (Year: 2025).*
Woolley, Bluetooth Core 5.4 Technical Overview, 2023, pp. 1-14. (Year: 2023).*
Martin Woolley, "The Bluetooth® Low Energy Primer," Version: 1.0.4, Revision Date: Jun. 6, 2022, 87 pages, publisher Bluetooth®.
Hung Bui, "Periodic Advertising with Responses (PAwR): A practical guide," Software—nRF Connect SDK guides—Nordic DevZone, Sep. 13, 2023, 16 pages, available at https://devzone.nordicsemi.com/guides/nrf-connect-sdk-guides/b/software/posts/periodic-advertising-with-responses-pawr-a-practical-guide.
Kai Ren, "What You Need to Know AboutPeriodic Advertising Sync Transfer," Bluetooth® Technology Website, Feb. 28, 2019, 5 pages, available at https://www.bluetooth.com/blog/periodic-advertising-sync-transfer/.
Ibrahim Sayyed, et al., "Systems and Methods for Handling Embedded Controller Diagnostic Tests Using a Hardware-Based Security Architecture Driver of a Heterogenous Computing Platform," U.S. Appl. No. 18/672,152, May 23, 2024, 30 pages.

* cited by examiner

*Primary Examiner* — Benjamin E Lanier
(74) *Attorney, Agent, or Firm* — Fogarty LLP

(57) ABSTRACT

A first device may have an error, which may prompt a human user to use a second device for diagnostics. The first device may include a radio, which may communicate with a radio of the second device. The first device and the second device may perform a verification operation based on a secure data element, such as a unique identifier of the first device. Once verified, the first device and the second device may pair and then establish a connection. The verification operation may allow the first device and the second device to avoid some procedures, such as service discovery.

15 Claims, 7 Drawing Sheets

200

300

400

500

SYSTEMS AND METHODS FOR SECURE PAIRING AND COMMUNICATION BETWEEN DEVICES

FIELD

This disclosure relates generally to Information Handling Systems (IHSs), and more specifically, to systems and methods for secure pairing and communication between devices.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use, such as financial transaction processing, airline reservations, enterprise data storage, or global communications. In addition, IHSs may include a variety of hardware and software components that may be configured to process, store, and communicate information and may include one or more computer systems, data storage systems, and networking systems.

SUMMARY

According to one embodiment, an information handling system (IHS) includes: a transceiver; one or more processor cores; and a memory storing computer-readable instructions, which when executed by the one or more processor cores, causes the IHS to: receive and decode a first packet by the transceiver, the first packet including channel and timing offset information for a second packet; receive and decode the second packet according to the channel and timing offset information from the first packet, wherein the second packet includes a first secure data element; verify the first secure data element; in response to verifying the first secure data element, transmit a third packet via the transceiver to a device associated with the first packet and the second packet, wherein the third packet is transmitted within a same elapsed time as a subevent associated with the second packet; and subsequent to transmitting the third packet, pair the IHS with the device.

According to another embodiment, a method includes: transmitting a first packet by a first device, wherein the first packet includes channel and timing offset information for a second packet; transmitting the second packet that includes a first secure data element, wherein the second packet conforms to the channel and timing offset information and is an instance of a subevent within a periodic interval; receiving a third packet by a second device in response to the second packet, wherein the third packet has been transmitted in a response slot within the subevent; and pairing and connecting with the second device in response to receiving the third packet.

According to another embodiment, a non-transitory computer-readable storage device having instructions stored thereon for establishing secured communication with an information handling system (IHS), wherein execution of the instructions by one or more processors of the IHS causes the one or more processors to: receive and decode a first packet by the transceiver, the first packet including channel and timing offset information for a second packet in an AUX_ADV_IND protocol data unit (PDU); receive and decode the second packet according to the channel and timing offset information from the first packet, wherein the second packet includes a verification code in an AUX_SYNC_SUBEVENT_IND PDU; verify the verification code; in response to verifying the verification code, transmit a third packet via the transceiver to a device associated with the first packet and the second packet, wherein the third packet has an AUX_SYNC_SUBEVENT_RSP PDU; and subsequent to transmitting the third packet, pair the IHS with the device.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

Figure 1:
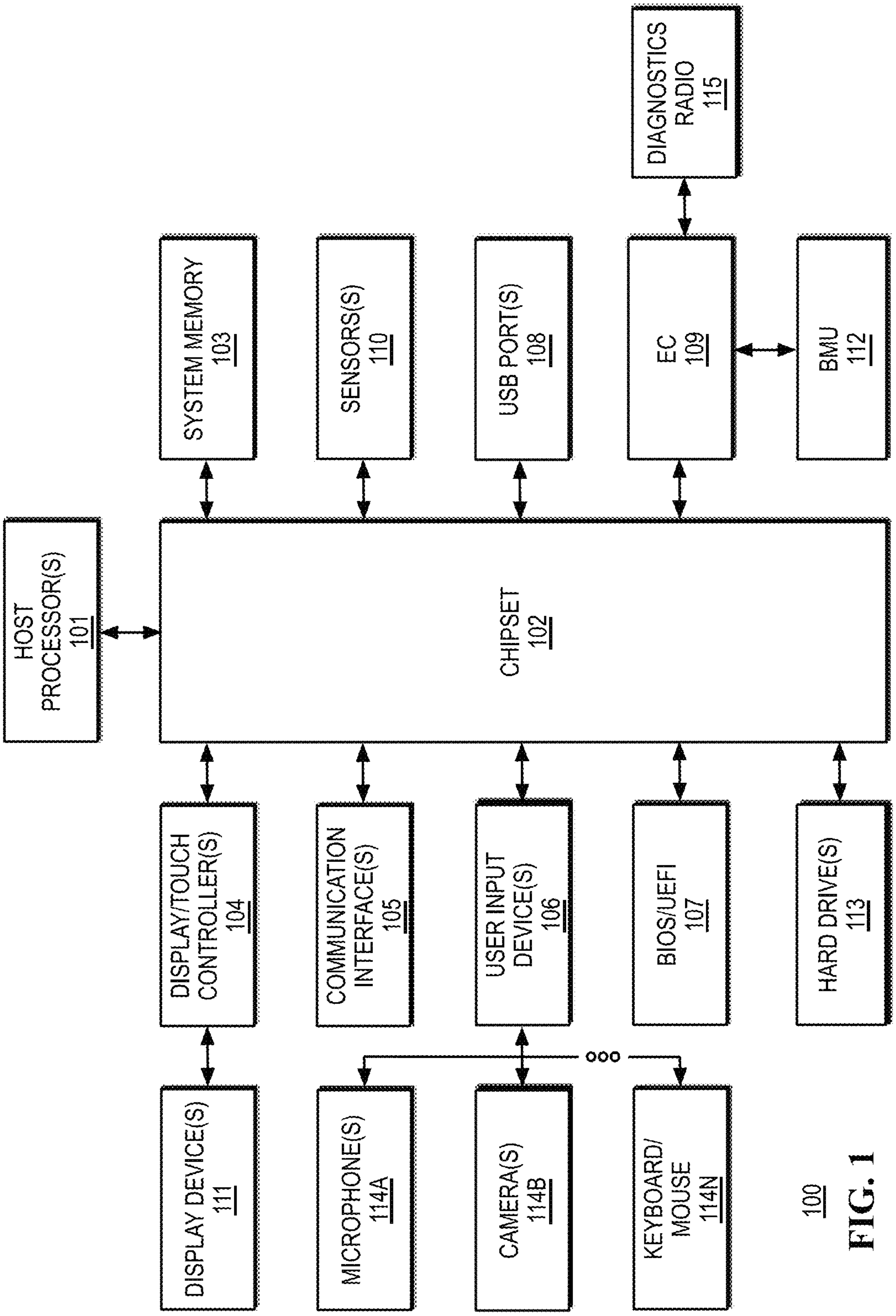
FIG. 1 is a block diagram of examples of components of an IHS, according to some embodiments.

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various Input/Output (I/O) devices, such as a keyboard, a mouse, touchscreen, and/or a video display. An IHS may also include one or more buses operable to transmit communications between the various hardware components.

Computing device diagnosis and repair may be expensive and time-consuming. For instance, some fault diagnostics may be difficult or impossible for an end user to perform, such as when a screen of a computing device appears not to work. The problem may lie with the screen itself or perhaps with other hardware and firmware component of the computing device. However, the end user may rely on the interface provided by the screen, so even unlocking the computing device and interacting with the computing device may confound the end user. As a result of some difficult to diagnose issues, many computing devices are returned to a vendor or third-party for diagnosis and repairs. Physically returning a device may be expensive and wasteful in some instances.

Various embodiments provide techniques for at least preliminarily diagnosing a hardware or software problem affecting a computing device. For instance, a device may be configured with an application-defined discovery and authentication functionality, which may be used to establish a wired or wireless diagnostics communication session.

In one example, a computing device may include a diagnostics radio, which may be configured to have access to diagnostics information. The diagnostics radio may include a memory to store firmware code and a processor core to execute the firmware code to provide an application that may set up a secure communication session to another device to allow for bidirectional communication. In one example, the diagnostics radio may be configured to be always on when power is available. In another example, a polling mechanism may be developed between the diagnostics radio and controlling functionality in the computing device. In other words, the polling mechanism may be used to turn the diagnostics radio on or off depending on various conditions. For example, the controlling functionality may inform the diagnostics radio when the computing device is fully functioning (e.g., no error or fault), thereby allowing the diagnostics radio to turn off. In another example, a watchdog timer may be implemented on the diagnostics radio to query the state of the computing device. The computing device may respond to the query with information regarding the presence of an error or a fault.

The diagnostics radio may be configured to communicate with another device, such as a smart phone or tablet device. The smart phone or tablet device may include an application that is configured to establish a communication session with the diagnostics radio and with a cloud-based application. Once the communication session is established, the smart phone or tablet device having the application may have bidirectional communication with the diagnostics radio and with the cloud-based application. The application on the smart phone or tablet may be configured to relay information between the diagnostics radio and the cloud-based application, and in some instances the application on the smart phone or tablet may be configured to perform some amount of diagnosis itself.

Thus, an advantage of some embodiments is that a communication session may be established, even for a device having an error or a fault. In an example in which a screen of the computing device is blank, it is expected that the diagnostics radio may still be functional, thereby allowing for a diagnostics communication session. Furthermore, the diagnostics communication session may be performed even without shipping the computing device to a vendor or third-party in some instances.

In some use cases, power efficiency and security may be valued. Some embodiments may allow for power efficiency and security by using a low-power communication protocol, such as Bluetooth Low Energy (BLE) or other suitable protocol. Furthermore, various embodiments may use procedures, either provided by the protocol or modified from the protocol, to establish a secure communication session between the computing device and the smart phone or tablet application.

In one example, the smart phone application may be configured to use Periodic Advertising with Responses (PAWR) to find and connect with the diagnostics radio. The smart phone application may send an encrypted advertisement in a synchronized timeslot, which may be validated by the diagnostics radio using various secure methods. Such secure methods may allow for the smart phone application and the diagnostics radio to verify each other. Furthermore, the secure methods may allow for the traditional service discovery process of BLE to be skipped.

Continuing with the example, the smart phone application may be configured as an advertising device, and the diagnostics radio may be configured as a scanning device. Both the smart phone application and the diagnostics radio may be configured to use extended advertising, including PAWR, to share a verification code. In such an instance, the smart phone application may be configured to generate a packet in a periodic advertising subevent, where the packet includes the verification code. The diagnostics radio may be configured to receive, decode, and parse the packet to receive the verification code, perform a verification operation using the verification code, and respond either negatively or affirmatively to the smart phone application. Once verification has been performed, then the diagnostics radio and the smart phone application may begin a pairing and connecting process.

Some embodiments include modifying a protocol data unit (PDU), such as an AUX_SYNC_SUBEVENT_IND PDU, to allow for the inclusion of the verification code. In some implementations, the verification code may be defined by an application layer, rather than a lower layer, thereby allowing for application-defined security and verification. An example advantage may include that the synchronized subevents may allow for quick communication before pairing has been performed. Another example advantage may include power savings due to the ability of such embodiments to omit the traditional service discovery process, which can be relatively slow and relatively power-hungry compared to the quick verification process described herein.

The scope of embodiments is not limited to the use of a laptop computer, desktop computer, a smart phone, or a tablet computer. Rather, various embodiments may implement a diagnostics radio in any appropriate IHS. Furthermore, while the description above refers to a smart phone application, it is understood that a similar application may be implemented on any other appropriate IHS, thereby allowing a first IHS and a second IHS to have a secure communication for diagnostics. Also, while the examples herein refer to the device with the diagnostics radio as a scanner and a smart phone or tablet as an advertiser, the roles may be reversed in some use cases. Additionally, while the description herein refers to BLE, it is understood that the principles described herein may be adapted for use in any appropriate communication protocol, whether wired or wireless.

FIG. 1 is a block diagram of examples of components of IHS 100, according to some embodiments. As shown, IHS 100 includes host processor(s) 101. In various embodiments, IHS 100 may be a single-processor system, or a multi-processor system including two or more processors. Host processor(s) 101 may include any processor capable of executing program instructions, such as an INTEL/AMD x86 processor, or any general-purpose or embedded processor implementing any of a variety of Instruction Set Architectures (ISAs), such as a Complex Instruction Set Computer (CISC) ISA, a Reduced Instruction Set Computer (RISC) ISA (e.g., one or more ARM core(s), or the like).

IHS 100 includes chipset 102 coupled to host processor(s) 101. Chipset 102 may provide host processor(s) 101 with access to several resources. In some cases, chipset 102 may utilize a QuickPath Interconnect (QPI) bus to communicate with host processor(s) 101. Chipset 102 may also be coupled to communication interface(s) 105 to enable communications between IHS 100 and various wired and/or wireless networks, such as ETHERNET, WIFI, BLUETOOTH (BT), cellular or mobile networks (e.g., Code-Division Multiple Access or “CDMA,” Time-Division Multiple Access or “TDMA,” Long-Term Evolution or “LTE,” etc.), satellite networks, or the like. Thus, communication interface 105 may include any of a variety of hardware and firmware to provide communications, including network interface cards, wireless transceivers, and the like.

Communication interface(s) 105 may be used to communicate with peripheral devices (e.g., BT speakers, headsets, etc.). Moreover, communication interface(s) 105 may be coupled to chipset 102 via a Peripheral Component Interconnect Express (PCIe) bus, or the like. Chipset 102 may be coupled to display and/or touchscreen controller(s) 104, which may include one or more Graphics Processor Units (GPUs) on a graphics bus, such as an Accelerated Graphics Port (AGP) or PCIe bus. As shown, display controller(s) 104 may provide video or display signals to one or more display device(s) 111.

Display device(s) 111 may include Liquid Crystal Display (LCD), Light Emitting Diode (LED), organic LED (OLED), or other thin film display technologies. Display device(s) 111 may include a plurality of pixels arranged in a matrix, configured to display visual information, such as text, two-dimensional images, video, three-dimensional images, etc. In some cases, display device(s) 111 may operate as a single continuous display, rather than two discrete displays.

Chipset 102 may provide host processor(s) 101 and/or display controller(s) 104 with access to system memory 103. In various embodiments, system memory 103 may be implemented using any suitable memory technology, such as static RAM (SRAM), dynamic RAM (DRAM) or magnetic disks, or any nonvolatile/Flash-type memory, such as a Solid-State Drive (SSD), Non-Volatile Memory Express (NVMe), or the like.

In certain embodiments, chipset 102 may also provide host processor(s) 101 with access to one or more USB ports 108, to which one or more peripheral devices may be coupled (e.g., integrated or external webcams, microphones, speakers, etc.). Chipset 102 may further provide host processor(s) 101 with access to one or more hard disk drives, solid-state drives, optical drives, or other removable-media drives 113.

Chipset 102 may also provide access to one or more user input devices 106, for example, using a super I/O controller or the like. Examples of user input devices 106 include, but are not limited to, microphone(s) 114A, camera(s) 114B, and keyboard/mouse 114N. Other user input devices 106 may include a touchpad, stylus or active pen, totem, etc. Each of user input devices 106 may include a respective controller (e.g., a touchpad may have its own touchpad controller) that interfaces with chipset 102 through a wired or wireless connection (e.g., via communication interfaces(s) 105). In some cases, chipset 102 may also provide access to one or more user output devices (e.g., video projectors, paper printers, 3D printers, loudspeakers, audio headsets, Virtual/Augmented Reality (VR/AR) devices, etc.).

In certain embodiments, chipset 102 may further provide an interface for communications with one or more hardware sensors 110. Sensor(s) 110 may be disposed on or within the chassis of IHS 100, or otherwise coupled to IHS 100, and may include, but are not limited to: electric, magnetic, radio, optical (e.g., camera, webcam, etc.), infrared, thermal, force, pressure, acoustic (e.g., microphone), ultrasonic, proximity, position, deformation, bending, direction, movement, velocity, rotation, gyroscope, Inertial Measurement Unit (IMU), accelerometer, etc.

Basic Input/Output System (BIOS)/Unified Extensible Firmware Interface (UEFI) 107 is coupled to chipset 102. In some situations, the terms “BIOS” and “UEFI” may be used interchangeably. In operation, BIOS/UEFI 107 provides an abstraction layer that allows a host OS to interface with certain hardware components utilized by IHS 100.

When IHS 100 is powered on, host processor(s) 101 may utilize program instructions of BIOS/UEFI 107 to initialize and test hardware components coupled to IHS 100, and to load host OS 312 for use by IHS 100. As used herein, the term “pre-boot” refers to the period of time, processes, and/or environment between the initialization of host processor(s) 101 and its taking over by host OS 312, after host OS 312 is loaded and operational.

Through a hardware abstraction layer provided by BIOS/UEFI 107, software stored in system memory 103 and executed by host processor(s) 101 may interface with certain I/O devices that are coupled to IHS 100.

Embedded Controller (EC) 109 (sometimes referred to as a Baseboard Management Controller or “BMC”) includes a microcontroller unit or processor core dedicated to handling selected IHS operations not ordinarily handled by host processor(s) 101. Examples of such operations may include, but are not limited to: power sequencing, power management, receiving and processing signals from a keyboard or touchpad, as well as operating chassis buttons and/or switches (e.g., power button, laptop lid switch, etc.), receiving and processing thermal measurements (e.g., performing cooling fan control, CPU and GPU throttling, and emergency shutdown), controlling indicator Light-Emitting Diodes or “LEDs” (e.g., caps lock, scroll lock, num lock, battery, ac, power, wireless LAN, sleep, etc.), managing a battery charger and a battery, enabling remote management, diagnostic tests (or “diagnostics”), repair, coordinating firmware updates, and/or remediation over an out of band or sideband network, etc.

Unlike other devices in IHS 100, EC 109 may be operational from the time IHS 100 is first powered on, before other devices are fully running or even powered. As such, EC 109 firmware may be responsible for interfacing with a power adapter to manage the various power states that may be supported by IHS 100. Power operations of the EC 109 may also provide other components of the IHS 100 with power status information for the IHS, such as whether IHS 100 is operating from battery power or is plugged into an AC power source. Firmware instructions utilized by EC 109 may be used to manage other core operations of IHS 100 (e.g., turbo modes, maximum operating clock frequencies of certain components, etc.).

EC 109 may implement operations for detecting certain changes to the physical configuration or posture of IHS 100 (such as a laptop computer). For instance, when IHS 100 as a 2-in-1 laptop/tablet form factor, EC 109 may receive inputs from a lid position or hinge angle sensor 110, and may use those inputs to determine: whether the two sides of IHS 100 have been latched together to a closed position or a tablet position, the magnitude of a hinge or lid angle, etc. In response to these changes, EC 109 may enable or disable certain features of IHS 100 (e.g., front or rear facing camera, etc.).

In some implementations, EC 109 may be installed as part of a Trusted Execution Environment (TEE) component to the motherboard of IHS 100. As a component with hardware root-of-trust (RoT), EC 109 may be further configured to calculate hashes or signatures that uniquely identify individual components of IHS 100. In such scenarios, EC 109 may calculate a hash value based on the configuration of a hardware and/or software component coupled to IHS 100. For instance, EC 109 may calculate a hash value based on all firmware and other code or settings stored in an onboard memory of a hardware component.

Hash values may be calculated as part of a trusted process of manufacturing IHS 100 and may be maintained in secure storage as a reference signature. EC 109 may later recalculate a hash value based on instructions and settings loaded for use by a hardware component of IHS 100 and may compare the calculated value against the reference hash value to determine if any modifications have been made to the component, thus indicating that the component has been compromised. As such, EC 109 may validate the integrity of hardware and software components installed in IHS 100.

In some embodiments, EC 109 may provide an OOB (Out-Of-Band) or sideband channel that allows an Information Technology Decision Maker (ITDM) or Original Equipment Manufacturer (OEM) to manage various settings and configurations of an IHS 100. OOB is used in contradistinction with "in-band" communication channels that operate only after networking 105 other interfaces of the IHS have been initialized, and the OS of the IHS has been successfully booted.

In various embodiments, IHS 100 may be coupled to an external power source through an AC adapter, power brick, or the like. The AC adapter may be removably coupled to a battery charge controller to provide IHS 100 with a source of DC power provided by battery cells of a battery system in the form of a battery pack (e.g., a lithium ion or "Li-ion" battery pack, or a nickel metal hydride or "NiMH" battery pack including one or more rechargeable batteries). Battery Management Unit (BMU) 112 may be coupled to EC 109 and it may include, for example, an Analog Front End (AFE), storage (e.g., non-volatile memory), and a microcontroller. In some cases, BMU 112 may be configured to collect and store information, and to provide that information to EC 109.

Examples of information collectible by BMU 112 may include, but are not limited to: operating conditions (e.g., battery operating conditions including battery state information such as battery current amplitude and/or current direction, battery voltage, battery charge cycles, battery state of charge, battery state of health, battery temperature, battery usage data such as charging and discharging data; and/or IHS operating conditions such as processor operating speed data, system power management and cooling system settings, state of "system present" pin signal), environmental or context information (e.g., such as ambient temperature, relative humidity, system geolocation measured by GPS or triangulation, time and date, etc.), etc.

In various embodiments, EC 109 may be coupled (e.g., via a GPIO pin) to any of a plurality of IHS components including, but not limited to: a fan, a cable, a battery, a temperature sensor, or a display. Moreover, EC 109 may be configured to perform or trigger the performance of any number of diagnostic operations for any of these components. For example, in some cases EC 109 may be configured to request that display 111 perform a Built-In-Self-Test (BIST) and to return BIST results to EC 109 upon completion. In other cases, however, EC 109 may itself run the diagnostic operation.

Further in this example, the EC 109 is coupled to diagnostics radio 115. The diagnostics radio 115 may include a memory configured to store computer-readable instructions (e.g., firmware code) and a processor core configured to execute those computer-readable instructions. The processor core, when executing the computer-readable instructions, may be configured to cause the diagnostics radio 115 to perform a variety of different functions. For instance, the diagnostics radio 115 may be configured to communicate with the EC 109 to receive diagnostics information from the EC 109 and to transmit information from another entity (e.g., a smart phone application and/or a cloud-based application) to the EC 109.

In one example, the EC 109 includes functionality to gather health data from the various components 101-108 and 110-113 and to process that health data to generate diagnostics data. The diagnostics radio 115 may be configured as a tool to communicate that health data and diagnostics data out of the IHS 100 and to another component (e.g., a smart phone application or a cloud-based application) and to communicate data from another component (e.g., smart phone application or a cloud-based application) to the EC 109. In some examples, the diagnostics radio 115 may include a transceiver that is configured to transmit and receive wired and/or wireless communication signals.

The EC 109 and the diagnostics radio 115 may be functionally coupled in any appropriate manner, such as by using a I2C interface or other appropriate interface. Furthermore, as discussed above, the EC 109 is out of band and is, thus, not under control of a host operating system running on the host processor 101. Therefore, the diagnostics radio 115 may be shielded from tampering by users who do not have an appropriate level of rights to access the EC 109.

In one example, the IHS 100 may be configured as a device that is to be diagnosed (e.g., a laptop or desktop computing system). In another example, the IHS 100 may be configured as a device that communicates with the device to be diagnosed (e.g., a smart phone or tablet computer). In an example in which the IHS 100 is configured as a device that communicates with the device to be diagnosed, then the IHS 100 may or may not include the diagnostics radio 115 or the EC 109.

In some embodiments, IHS 100 may not include all components shown in FIG. 1. In other embodiments, IHS 100 may include other components in addition to those shown in FIG. 1. Furthermore, some components illustrated as separate components in FIG. 1 may instead be integrated with other components, such that all or a portion of the operations executed by the illustrated components may instead be executed by the integrated component.

For instance, in various embodiments, host processor(s) 101 and/or other components shown in FIG. 1 (e.g., chipset

102, display controller(s) 104, communication interface(s) 105, EC 109, etc.) may be replaced by devices within a heterogenous computing platform. As such, IHS 100 may assume different form factors including, but not limited to: servers, workstations, desktops, laptops, appliances, video game consoles, tablets, smartphones, etc.

Figure 2:
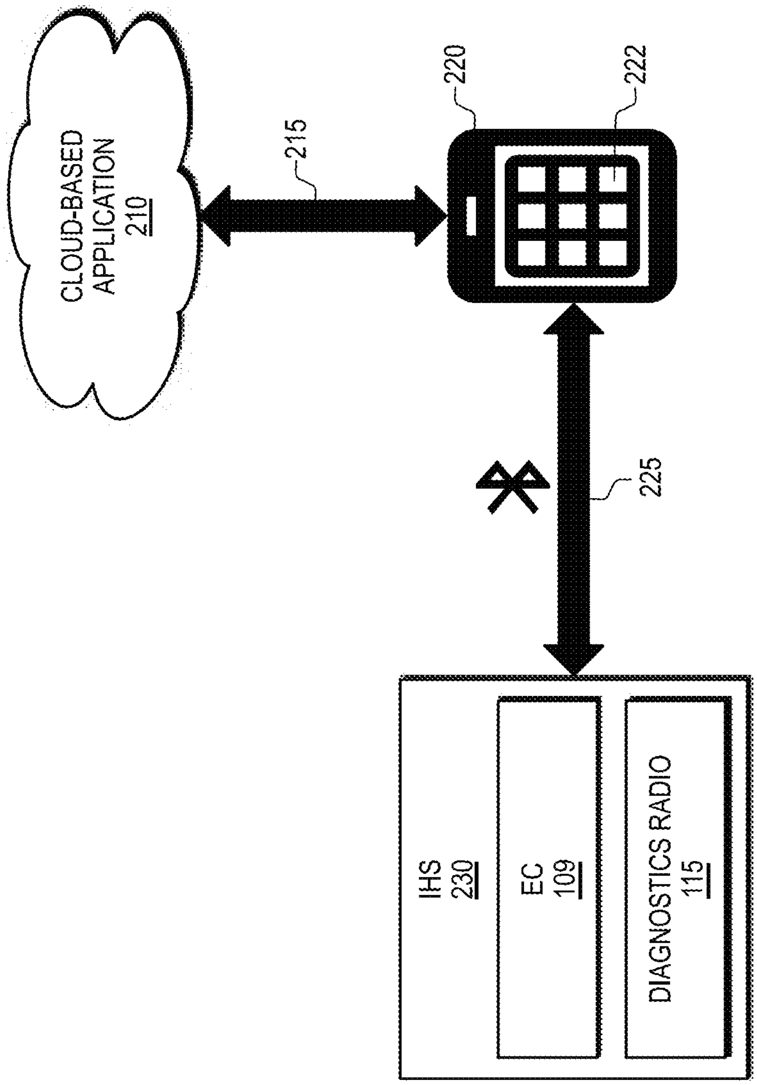
FIG. 2 is an illustration of an example system, according to some embodiments.

FIG. 2 is an illustration of example system 200, according to some embodiments. System 200 includes IHS 230, IHS 220, and cloud-based application 210. In this example, IHS 230 may be a laptop or desktop computer or may be a server computer, and it may be implemented the same as or similar to IHS 100 of FIG. 1. IHS 220 is shown as a smart phone or tablet computer, and it may be implemented the same as or similar to IHS 100 of FIG. 1. However, in the example of FIG. 2, IHS 230 is the device to be diagnosed and/or repaired, and IHS 230 is the device that communicates with the device to be diagnosed and/or repaired. For instance, IHS 230 may include a diagnostics radio, such as diagnostics radio 115 of FIG. 1. IHS 220 may or may not include a diagnostics radio, though IHS 220 may run an application 222, which is configured to advertise and set up secure communication session 225 and communicate with cloud-based application 210 over communication session 215.

Furthermore, in this example, the smart phone application 222 is configured as a BLE advertiser, and the diagnostic radio 115 is configured as a BLE scanner. That is before connection is established. Subsequent to connection being established, the smart phone application 222 may be configured as a peripheral, and diagnostic radio 115 may be configured as a central. However, it is within the scope of implementations that the roles may be reversed.

In this example, the smart phone application 222 and the diagnostics radio 115 may perform a verification operation. For instance, the verification operation may include a verification code, which is a type of secure data element, that may be transmitted from smart phone application 222 to diagnostics radio 115. The verification code may allow the diagnostics radio 115 to perform a comparison against a secure data element and, in the case of a match, the diagnostics radio 115 may verify that the smart phone application 222 is allowed to access the IHS 230. In an example in which the verification code cannot be verified by the diagnostics radio 115, the diagnostics radio 115 may be configured to not transfer any sensitive data from the IHS 230 or allow access by the smart phone application 222 to the IHS 230.

In one example, the verification code may be based on a unique identifier of the IHS 230. For instance, the IHS 230 may include a serial number or service tag number that may be accessible by someone in physical possession of the IHS 230 or an authorized user of the IHS 230. A human user of the smart phone application 222 may enter the verification code into the user interface of the application 222. The application 222 may then transmit either the code itself or a secure data element derived from the code to the diagnostics radio 115 (e.g., by broadcasting an advertising packet). The diagnostics radio 115 may include firmware functionality that is configured to receive and decode the advertising packet and parse the contents of the advertising packet to access the data that was sent by the smart phone application 222. Continuing with the example, the diagnostics radio 115 may have access to the unique identifier of the IHS 230, such as a serial number or service tag number, by reading a memory of the IHS 230. The diagnostics radio 115 may compare the received data from the advertising packet to data that the diagnostics radio 115 may access from the memory of the IHS 230 to determine whether a match can be made. If no match is made, then the diagnostics radio 115 may simply not respond to the application 222 or may respond with an error.

However, if a match is made, then the diagnostics radio 115 may respond to the application 222, perhaps with another verification code or secure data element to allow for bi-directional verification or may simply respond with an indication that verification is positive. In any event, once verification has been established, then the application 222 and the diagnostics radio 115 may establish communication session 225 by pairing and connecting.

In another example, a human user of the application 222 may enter a serial number or some other unique identifier of the IHS 230 into the application 222. The application 222 may then communicate with the cloud-based application 210, perhaps by providing the unique identifier, and the cloud-based application 210 may then return a secure data element to the application 222. The application 222 may display the secure data element on its user interface as a text string. The smart phone application 222 may instruct a human user of the smart phone application 222 to enter the displayed text string into the IHS 230 using a keyboard or other entry device of the IHS 230. The text string would have been preconfigured to match some secure data of the IHS 230. For instance, the IHS 230 may have been configured in the factory to include one or more repair codes, and the cloud-based application 210 may have a database of identifiers corresponding to various repair codes. The cloud-based application 210 may search its database to retrieve a valid repair code as the secure data element and to cause that repair code or a derivative of the repair code to appear on the user interface of application 222 as the secure data element.

Continuing with the example, the diagnostics radio 115 may receive the secure data element in an advertising packet from application 222. The diagnostics radio 115 may then determine whether a match exists and, if a match does exist, allow a pairing and connection process to begin with the application 222.

In another example, the repair code may be provided to the smart phone application 222 from a source other than the cloud-based application 210. For instance, a service technician who has access to a database of IHSs and repair codes may search that database for a repair code that is expected to work with the IHS 230, and then that service technician may transmit that repair code by text message or other means to the IHS 220.

Furthermore, the application 222 is configured to be in communication with the cloud-based application 210 over communication session 215. Communication session 215 may be implemented using any appropriate protocol, such as a cellular data protocol, WiFi, or the like. The cloud-based application 210 may be associated with a vendor or other authorized party corresponding to the IHS 230 and the application 222. For instance, the cloud-based application 210 may include stored records of various IHSs, including IHS 230, and may also include stored records of applications, such as application 222. Furthermore, the cloud-based application 210 may have administrative rights, such as may configure cloud-based application 210 to authorize smart phone application 222 and to have rights to access diagnostic and health information of the IHS 230 via the diagnostics radio 115.

The secure data element (e.g., verification code, unique identifier, repair code, text string derived from any of those) may be defined by an application layer and may be verified by the application layer. This is in contrast to other BLE functionality, such as Privacy, which may be implemented by link layer functionality, where link layer functionality is lower in the protocol stack than is the application layer. In the example of FIG. 2, the firmware on the diagnostics radio 115 may include application layer functionality to verify the secure data element, and the application 222 may include application layer functionality to provide the secure data element and perhaps to verify another secure data element received from the IHS 230 if appropriate.

The cloud-based application 210 may include diagnostics and repair functionality configured to diagnose and/or repair malfunction issues that may be present in IHS 230. As noted above, the EC 109 may gather health data and error data from hardware and firmware components of the IHS 230. The diagnostics radio 115 may make that health data and error data available to the cloud-based application 210 via communication session 225 and communication session 215. In one example, the EC 109 and the cloud-based application 210 may be pre-configured with a shared secret, which may be used for encrypting communications between the IHS 230 and the cloud-based application 210. In such an instance, the application 222 may be unable to decrypt those encrypted communications and may act as a relay between EC 109 and cloud-based application 210. On the other hand, some information may be less sensitive and may be able to be passed to the application 222 in a form that may be decrypted by the application 222 for display on the user interface of application 222. The distinction between information that may be sensitive and only accessible by the EC 109 in the cloud-based application 210 and information that may be less sensitive and accessed by the application 222 may be determined in any appropriate manner. Furthermore, the distinction between more sensitive information and less sensitive information may be defined at the application layer rather than at a lower layer in the protocol stack.

In one example use case, the display screen of IHS 230 may be inoperable. An end user of the IHS 230 may be in physical possession of both the IHS 230 and the IHS 220. In this example, and end user may include a consumer, an IT professional, or other user. Furthermore, the end user may also have access to the application 222. The end user may open the application 222 and enter a unique identifier (e.g., a serial number, service tag, or the like) of the IHS 230 into the user interface of the application 222. The end-user's entry of the unique identifier indicates that it is IHS 230 that is in need of diagnosis and/or repair. The application 222 may then communicate with the cloud-based application 210 to indicate to the cloud-based application 210 that the IHS 230 is beginning a diagnosis operation. The user may then be given a secure data element to enter either into the user interface of the application 222 or into the keyboard of the IHS 230. Example processes of providing the secure data element are described above (e.g., displayed on user interface of application 222, received by text message). However, in another example, the unique identifier entered by the user to begin the process may be used by the application 222 to begin the verification process with diagnostics radio 115.

Assuming that the outcome of the verification process is positive, then the diagnostics radio 115 and the application 222 may pair and connect to set up communication session 225. The communication session 215 is already in existence between the application 222 and the cloud-based application 210. Once communication sessions 225, 215 are in place, then the cloud-based application 210 may have access to the EC 109. The cloud-based application 210 and the EC 109 may then communicate bidirectionally, providing health data and error data from the EC 109 to the cloud-based application 210. The cloud-based application 210 may perform analysis and provide results of the analysis to the application 222 and to the EC 109. In an example operation, the cloud-based application 210 may determine a specific error (e.g., display hardware is faulty) and then provide instructions to the end user via the application 222. Such instructions may include an indication for the end-user to return the IHS 232 the vendor for repair. In some instances, when a specific error may be repaired over the air, such as by updating firmware, then the cloud-based application 210 may coordinate with the EC 109 to update the firmware.

Once the operation has completed, the communication sessions 215, 225 may be torn down. One potential advantage of such embodiments is that a diagnosis, or at least a preliminary diagnosis, may be performed by the end-user without the need for an on-site visit by a human technician. In other words, such embodiments may be more efficient of time and resources.

Figure 3:
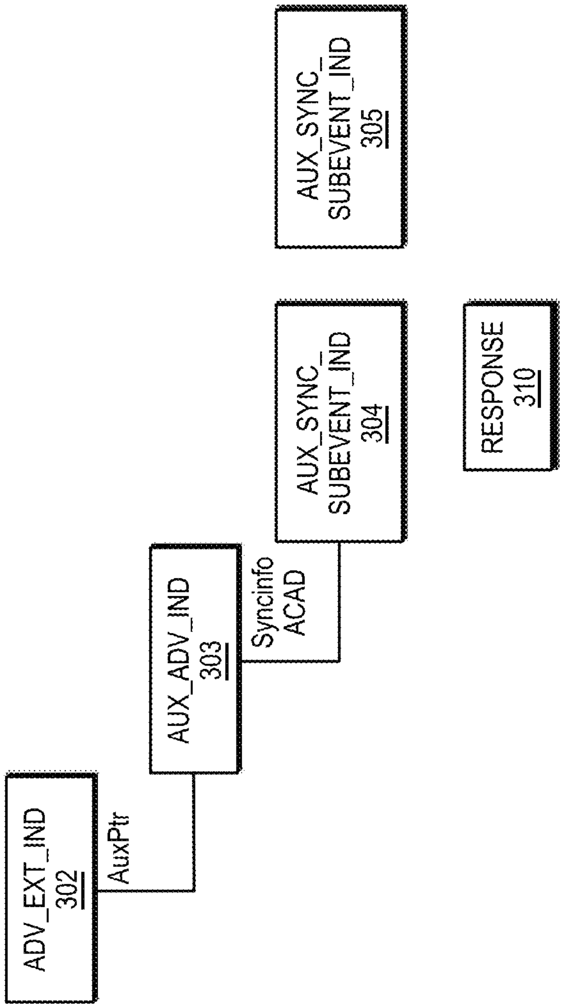
FIG. 3 is an illustration of an example time domain operation, according to some embodiments.
Figure 4:
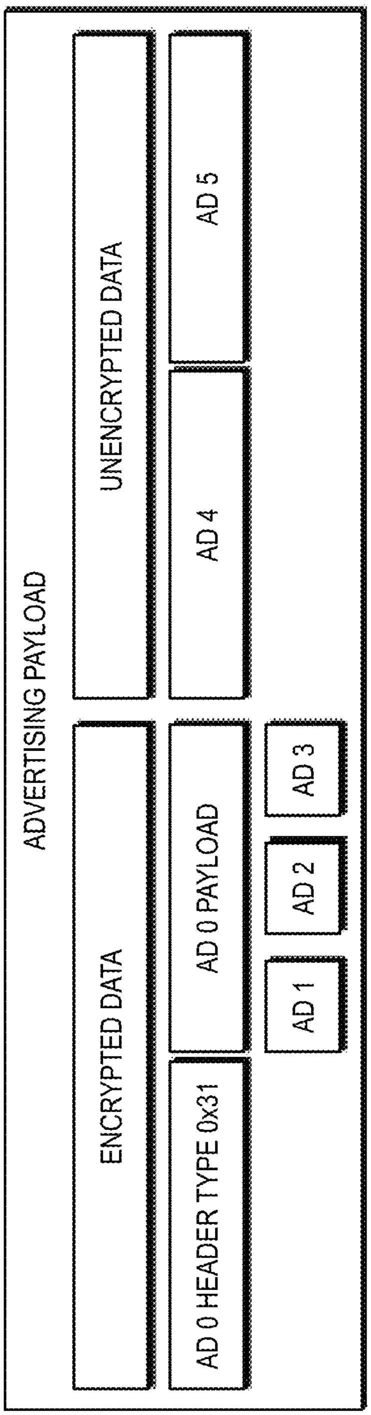
FIG. 4 is an illustration of an example advertising payload, which may be included in an advertising packet, such as the example packet of FIG. 3, according to some embodiments.
Figure 5:
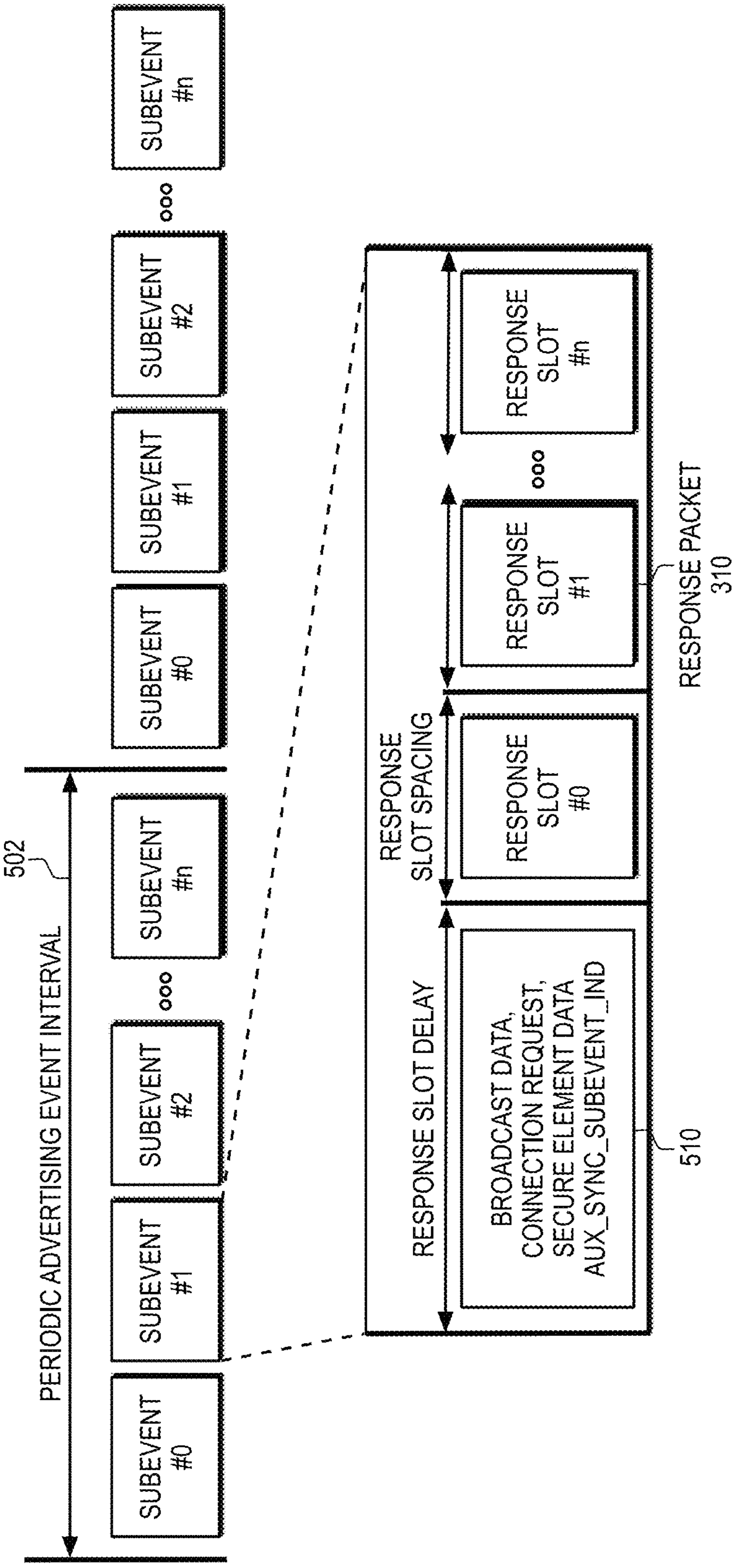
FIG. 5 is an illustration of an example time domain operation, according to some embodiments.

The verification process, which is performed before pairing between the application 222 and the diagnostics radio 115, may be performed in any appropriate manner and according to any appropriate communications protocol. FIGS. 3-5 illustrate an example of the verification process, performed according to PAWR, as defined in the BLE standards.

FIG. 3 is an illustration of an example time domain operation 300, according to some embodiments. For this example, the diagnostic radio 115 is assumed to be the scanner, and the smart phone application 222 is assumed to be the advertiser. However, the scope of embodiments may include a role reversal as appropriate.

The time domain operation 300 includes the diagnostic radio 115 being powered on and "listening" for advertising packets that may be broadcast by various devices. The smart phone application 222, running on IHS 220, operates in a mode consistent with PAWR. The smart phone application 222 may cause a transceiver in IHS 220 to transmit packets, such as packets 302-305.

The packet 302 includes the ADV_EXT_IND PROTOCOL DATA UNIT (PDU), which is transmitted on primary advertisement channels and contains the AuxPtr field. The AuxPtr field points to packet 303, which includes an associated AUX_ADV_IND PDU and is transmitted on the secondary advertising channels (e.g., data channels, as defined by BLE). The AUX_ADV_IND PDU in the packet 303 may include a header field SyncInfo, which provides synchronization information including channel and timing offset information.

Thus, in one example, the diagnostics radio 115 may receive, decode, and parse the packet 302 to access the AuxPtr field. The AuxPtr field points the diagnostics radio 115 to a channel and a timing associated with the packet 303. The diagnostics radio 115 may receive, decode, and parse the AUX_ADV_IND PDU to access the Syncinfo field, which includes channel and timing offset information for the packets 304 and 305.

With synchronization information obtained from the AUX_ADV_IND PDU the diagnostics radio 115 will scan for a PDU of type AUX_SYNC_SUBEVENT_IND, which is included in the example packets 304 and 305. The packets 304 and 305, having the AUX_SYNC_SUBEVENT_IND PDUs, occur at known timing intervals, thereby allowing diagnostics radio 115 to scan for application data at a precise time, which may make verification process more energy efficient.

In one example, the diagnostics radio 115 synchronizes with at least one of the AUX_SYNC_SUBEVENT_IND PDUs found in packets 304 and 305. For purposes of this example, the diagnostics radio 115 may synchronize with the packet 304. The diagnostics radio 115 may receive, decode, and parse the information in the AUX_SYNC_SUBEVENT_IND PDUs to access application-defined secured element data. The diagnostics radio 115 may perform a comparison using the secure data element and, in the case of a positive outcome, may transmit response packet 310 in a response slot, which occurs within a defined time period of a subevent associated with packet 304. Thus, the time domain operation 300 may provide bidirectional data communication between the application 222 and the diagnostics radio 115.

Further in this example, the bidirectional communication of packet 304 and response packet 310 may be encrypted for security. For instance, some embodiments may include a shared secret with which to encrypt and decrypt the data, where that secret is shared by the diagnostics radio 115 and the application 222. For instance, the secret may be installed in a secure memory on the diagnostics radio 115 during manufacture or may be programmed by the EC 109 at a later time. The shared secret may be provisioned in the application 222 during operation by, e.g., cloud-based application 210. For instance, the cloud-based application 210 may include a database that links various IHSs with available encryption keys. The cloud-based application 210 may receive a unique identifier of IHS 230, search for a corresponding encryption key in its database, and provide that encryption key to the application 222. In one example, a new generic attribute profile (GATT) characteristic may be used, where that new GATT characteristic may include encrypted data key material and can be included as part of the generic access profile (GAP) service. A GATT client may read this characteristic over an encrypted and authenticated link, which then allows encrypted data to be exchanged over advertisements.

Assuming that the diagnostics radio 115 and the application 222 have the shared secret and the ability to encrypt and decrypt, then at least some of the information in the packet 304 and at least some of the information in the response packet 310 may be encrypted accordingly. Such encryption may allow for secure communications at the pre-pairing verification stage.

FIG. 4 is an illustration of example advertising payload 400, which may be included in an advertising packet, such as the packet 304 of FIG. 3, according to some embodiments. For instance, the advertising payload 400 may include the secure data element, passed from application 222 to the diagnostics radio 115, as an encrypted portion of data in the example payload 400 in some implementations. The advertising payload 400 may be included in a PDU, such as the AUX_SYNC_SUBEVENT_IND PDU.

Advertisement Data (AD) 0 encapsulates AD 1-3, which are encrypted. That is followed by AD 4 and 5, which are unencrypted. This allows for flexibility and keeping some of the non-critical advertising data open for any observer to interpret (for diagnostics app or other apps or native Bluetooth advertising functions), for example, AD Type 0x01 (Flags) or 0x09 (Complete Local Name). Thus, in some examples, the secure data element (e.g., verification code, unique identifier, or data derived therefrom) may be included in one or more of AD1-AD3. Nevertheless, the scope of implementations is not limited to any payload format, nor any specific quantity of encrypted fields.

FIG. 5 is an illustration of example time domain operation 500, according to some embodiments. The example time domain operation 500 includes actions that may be performed by application 222 as well as by diagnostics radio 115.

Periodic advertising event interval 502 is an interval, which may be defined by the periodic advertising functionality of BLE. For instance, a periodic advertising interval may include a multitude of transmitted packets, such as packets including an AUX_SYNC_IND PDU. Examples may include packet 304 and 305 of FIG. 3. An advertiser may transmit multiple packets within interval 502 and when 502 is over, begin another interval, which may repeat the same packets. In the example of FIG. 3, only packets 304 and 305 are shown as being transmitted within an interval, though the particular interval may include more or fewer packets, and the interval may be repeated over and over.

In one example, a periodic advertising interval may be defined as anywhere from 7.5 ms to 81.91875 seconds. Furthermore, the quantity of subevents within a periodic advertising interval may be defined by a particular use case, and in the case of BLE, the quantity of subevents within a periodic advertising interval may be defined as an appropriate quantity in the range 1-128. An interval of a subevent (e.g., an elapsed time between the beginning of a first subevent and the beginning of the next subsequent subevent) may be defined within the range of 7.5 ms to 318.75 ms. Of course, the scope of implementations may use any appropriate advertising interval and subevent interval.

In the present example, periodic advertising event interval 502 includes n subevents, where n may be any appropriate positive integer. One of the subevents (subevent 1) is illustrated in more detail, and it is understood that the other subevents within interval 502 may include the same format as subevent 1.

A scanning device (e.g., diagnostics radio 115) may synchronize to a particular subevent within periodic advertising event interval 502. In one example, the application 222 may include data in the packet 303 to indicate that the diagnostics radio 115 should synchronize to a particular one of the subevents. Each subevent may include an advertising packet having an AUX_SYNC_SUBEVENT_IND PDU. In some examples, multiple scanning devices may be subscribed to the same subevent, and a scanner may subscribe to multiple subevents.

In one example use case, the diagnostics radio 115 and the smart phone application 222 are performing the time domain operation 300 of FIG. 3, where the diagnostics radio 115 parses the AUX_ADV_IND PDU of packet 303 and, in response to data in that PDU, synchronizes to packet 304, which includes the AUX_SYNC_SUBEVENT_IND PDU. For instance, packet 304 may correspond to subevent 1 within periodic advertising event interval 502, and packet 305 may correspond to subevent 2 within periodic advertising event interval 502.

Continuing with the example, the AUX_SYNC_SUBEVENT_IND PDU may include the fields 510. For instance, the fields 510 may include broadcast data and/or a connection request. The broadcast data may include, among other things, the secure data element, discussed above. The secure data element, once received and parsed by the diagnostics radio 115, may allow the diagnostics radio 115 to verify the legitimacy of the communication packet as well as to verify the legitimacy of the connection request. In other words, the diagnostics radio 115, by verifying the secure data element, may be able to confirm that the smart phone application 222 is authorized to access the IHS 230 and is not, e.g., a malicious user.

The diagnostics radio 115 may be configured to respond to the connection request in fields 510, responsive to having verified the secure data element. In some examples, the broadcast data in field 510 may instruct the diagnostics radio 115 as to which response slot to use. In another example, the particular response slot may be preconfigured in nonvolatile memory in the diagnostics radio 115. For instance, the diagnostics radio 115 may be instructed to use response slot 1 for response. Accordingly, the diagnostics radio 115 may transmit packet 310 within response slot 1. The packet 310 may include a connection response, responding to the connection request in the affirmative. And although not shown herein, some embodiments may include the diagnostics radio 115 transmitting a secure data element back to the smart phone application 222 in packet 310, thereby allowing the smart phone application 222 to verify the diagnostics radio 115.

After time domain operation 500, the diagnostics radio 115 has either verified application 222 and is prepared to begin paring and connecting or has failed to verify and has determined to not pursue the communication with application 222.

Assuming that verification is successful, the diagnostics radio 115 and the application 222 may begin paring and connecting. In some implementations that use BLE, the paring and connecting may use traditional paring and connecting procedures. For instance, some paring and connecting procedures may include sharing an encryption code between the diagnostics radio 115 and the application 222, thereby allowing the application 222 and the diagnostics radio 115 to encrypt and decrypt their communications. Connecting may include establishing a connection event and participating in the connection event through bidirectional communication. Once the application 222 and the diagnostics radio 115 have been paired and have established a connection, the diagnostics radio 115 and the application 222 may communicate with each other, the application 222 may communicate with the cloud-based application 210, and the EC 109 may communicate with the cloud-based application 210 via the smart phone application 222. Any appropriate data may be communicated among the components, such as health information, diagnostics information, information for consumption of the end user, instructions that may allow the EC 109 to repair an error (e.g., updating firmware), and the like.

Of note in the embodiments of FIGS. 2-5, the orchestration of the response by the diagnostics radio 115 is handled by the application layer, which may allow for validation of the secure data element. Put another way, the diagnostics radio 115 may have a processor core, which is configured to execute computer-readable instructions to cause the diagnostics radio 115 to run an application. That application may be configured to parse the secure data element, received from the AUX_SYNC_SUBEVENT_IND PDU, access a reference secure data element, compare the secure data element to the reference secure data element, and either verify or not verify. Such process may be separate and apart from any other procedures provided in standard BLE.

In another aspect, the data, such as that in fields 510, is organized in a relatively small packet within deterministic time slots, allowing the diagnostics radio 115 to precisely synchronize. The diagnostics radio 115, one synchronized, may decode the packet, parse the data therein, and perform the verification comparison.

An advantage of such embodiments is that the connectionless bidirectional communication may be performed relatively quickly and with relatively low power use. Relatively low power use may allow for increased battery life in some instances. Also, the verification actions, such as described with respect to FIG. 5, may allow the diagnostics radio 115 and the application 222 to omit or skip a service discovery step. Instead, the application layers of the diagnostics radio 115 and the application 222 may be configured using firmware or software to perform further actions once verified, where examples of those actions may include paring, connecting, and exchanging certain information.

It is generally expected that the service discovery performed by typical BLE devices may be relatively slow and relatively power-hungry, so skipping the service discovery may allow for a quicker connection and a lower power session.

In a further example, the time domain operations shown in FIG. 3 and FIG. 5 may include reduced power operation. For instance, BLE may as a default have a maximum operating power. By contrast, some embodiments may reduce that power for transmissions of packets 302-305 and 310. An advantage of reducing the power may include reducing a physical range at which the communications may be detected, thereby helping to ensure that only a user in physical control of the IHS 230 (or at least within visual distance of the user) may access sensitive communications between diagnostics radio 115 and application 222.

Figure 6:
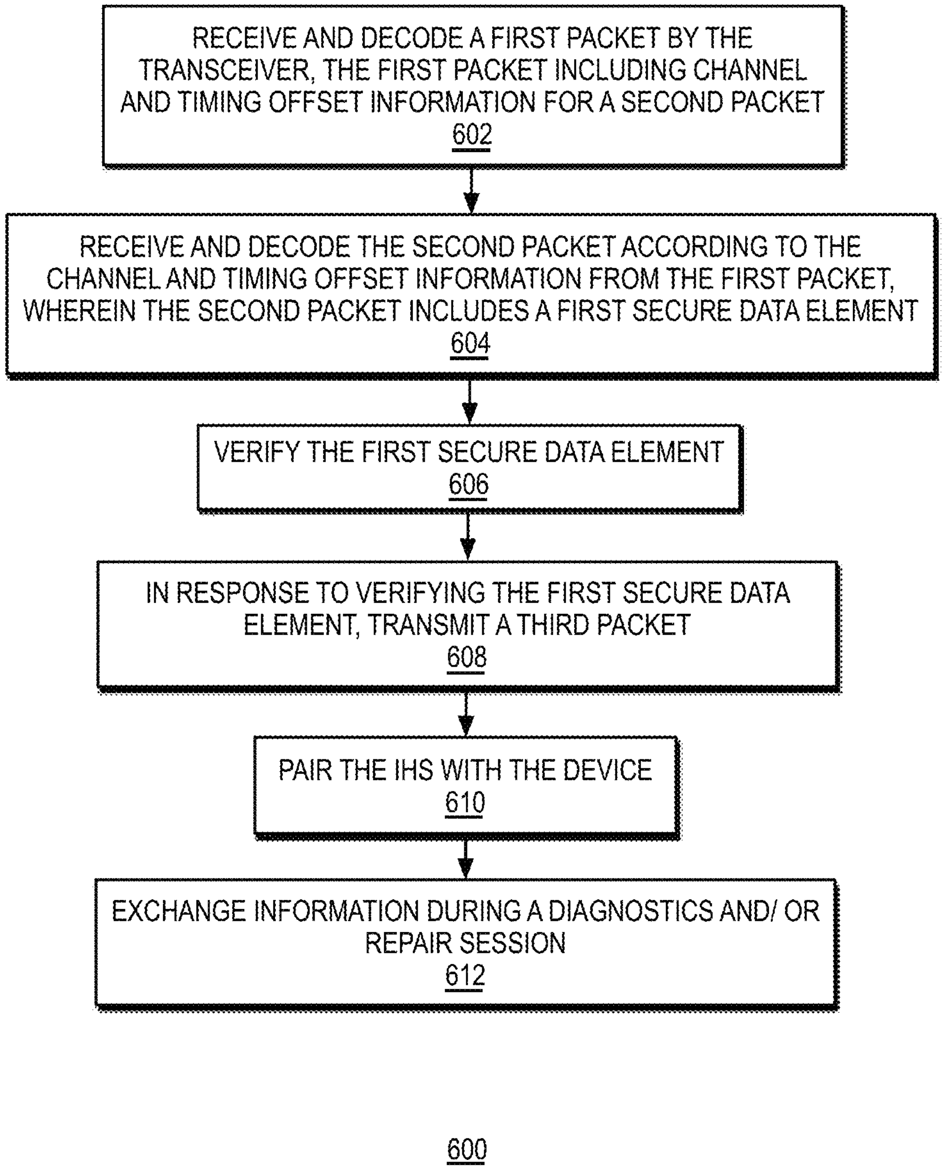
FIG. 6 is an illustration of an example method, according to some embodiments.

FIG. 6 is an illustration of example method 600, according to some embodiments. Method 600 may be performed by a scanning device, such as diagnostics radio 115. Specifically, a scanning device may include a processor core and have computer-readable instructions configured to cause the processor core to perform the actions of method 600.

At action 602, the diagnostics radio 115 receives and decodes a first packet. For instance, the receiving and decoding may be performed by a transceiver of the diagnostics radio 115. The first packet may include channel and timing offset information for a second packet. In one example, the packet 303 includes an AUX_ADV_IND PDU, which includes channel and timing information for the diagnostics radio 115 to use to synchronize with a repeating subevent in another channel.

At action 604, the diagnostics radio 115 receives and decodes the second packet according to the channel and timing offset information from the first packet. For instance, the diagnostics radio 115 may then synchronize with the periodic advertising event interval cycles of the application 222 so that the diagnostics radio 115 may scan the particular channel at a particular timing offset to receive a packet scheduled in a particular subevent. In the example of FIG. 5, the diagnostics radio 115 may receive channel and timing offset data so that it scans only for subevent 1 within the periodic advertising event interval cycles.

Further at action 604, the second packet includes a first secure data element. The first secure data element may be application-defined in may include any appropriate secure data element. Examples of secure data elements may include unique identifiers of the IHS 230, verification codes, one-time use codes, or anything else that may be guarded from malicious users and may be known only by a small group of people that includes an end user of the IHS 230.

Furthermore, the second packet may be encrypted based on a shared secret that may be built in at the factory for the IHS 230 and may be configured at the application 222 by the cloud-based application 210. Moreover, the second packet may include other broadcast data as well as a connection request.

Action 606, the diagnostics radio 115 may verify the first secure data element. For instance, the diagnostics radio 115 may receive the first secure data element in the second packet, parse that second packet to access the first secure data element, and then compare the first secure data element to a reference data element. Based on the comparing, the diagnostics radio 115 may either verify or not verify the application 222.

At action 608, the diagnostics radio 115 transmits a third packet in response to verifying the first secure data element. In the example of FIGS. 3 and 5, the diagnostics radio 115 may transmit the response packet 310 to the application 222. The response packet 310 may be transmitted within a same elapsed time as a subevent associated with the second packet. In the example of FIG. 5, the packet that includes the AUX_SYNC_SUBEVENT_IND PDU and the response packet 310 are both performed within the elapsed time associated with subevent 1.

At action 610, the diagnostics radio 115 and the application 222 pair. For instance, the diagnostics radio 115 and the application 222 may share encryption keys to allow them to encrypt and decrypt communications. Once pairing has been established, the diagnostics radio 115 and the application 222 may coordinate communications in a connection event. During the connection event, the diagnostics radio 115 and the application 222 may exchange information during a diagnostics and/or repair session at action 612.

Figure 7:
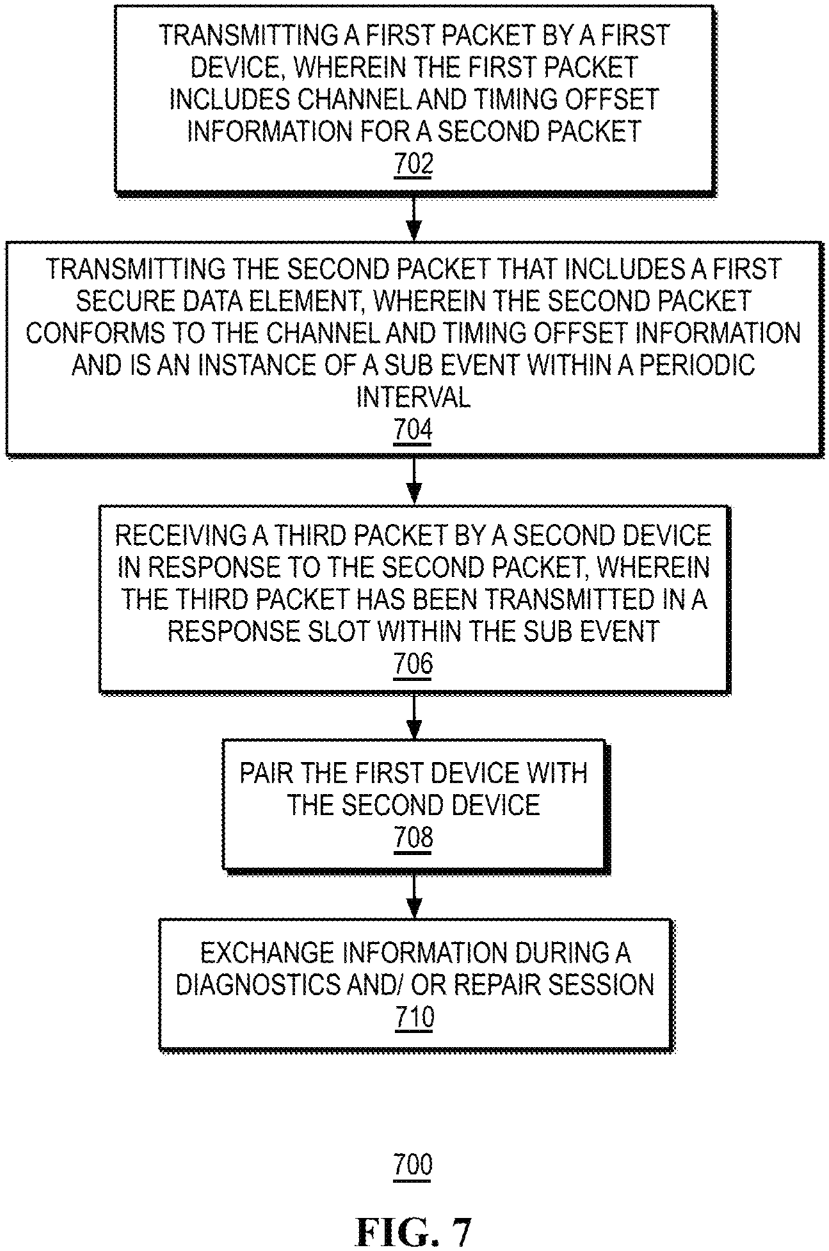
FIG. 7 is an illustration of an example method, according to some embodiments.

FIG. 7 is an illustration of example method 700, according to some embodiments. Method 700 may be performed by an advertising device, such as a smart phone or tablet that runs application 222. For instance, the advertising device may include one or more processor cores that execute computer-readable instructions to perform the actions of application 222.

Although not specifically illustrated in method 700, the application 222 may establish a communication session with a cloud-based application, such as cloud-based application 210.

At action 702, the application 222 transmits a first packet. In this example, the first packet includes channel and timing offset information for a second packet. An example may include packet 303 of FIG. 3 which includes the AUX_ADV_IND PDU.

At action 704, the application 222 transmits the second packet. The second packet may include a first secure data element. Furthermore, the second packet may conform to the channel and timing offset information and may be an instance of a subevent within a periodic interval. An example is described above with respect to packet 304, which may be associated with a subevent, such as subevent 1 of FIG. 5. Such subevent may be associated with a periodic advertising event interval, such as interval 502, which repeats. The second packet may include the first secure data element, such as shown in fields 510 of FIG. 5. Furthermore, the second packet may include a connection request.

At action 706, the application 222 may receive a third packet from a second device in response to the second packet. The third packet may have been transmitted in a response slot within the subevent. An example is shown at FIG. 5, where response packet 310 is sent in response slot 1, which is included in an elapsed time associated with subevent 1 within periodic advertising event interval 502.

The third packet may include a response to the connection request and may also include another secure data element, which the application 222 may use to verify the diagnostics radio 115. However, some embodiments may omit including a secure data element within the third packet.

In response to the third packet, the application 222 may pair with the diagnostics radio 115 at action 708. Once paired, the diagnostics radio 115 and the application 222 may exchange information during a diagnostics and/or repair session. The diagnostics and/or repair session of action 710 may include communication with the cloud-based application 210 as well.

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks.

Program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices.

Similarly, operational data may be identified and illustrated herein within modules and may be embodied in any suitable form and organized within any suitable type of data structure. Operational data may be collected as a single data set or may be distributed over different locations including over different storage devices.

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination thereof. Such configured devices are physically designed to perform the specified operation(s).

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs.

As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An information handling system (IHS) comprising:

a transceiver;

one or more processor cores; and a memory storing computer-readable instructions, which when executed by the one or more processor cores, causes the IHS to:

receive and decode a first packet by the transceiver, the first packet including channel and timing offset information for a second packet;

receive and decode the second packet according to the channel and timing offset information from the first packet, wherein the second packet includes a first secure data element;

verify the first secure data element;

in response to verifying the first secure data element, transmit a third packet via the transceiver to a device associated with the first packet and the second packet, wherein the third packet is transmitted within a same elapsed time as a subevent associated with the second packet;

subsequent to transmitting the third packet, pair the IHS with the device;

subsequent to pairing with the device, establish a communication session to transmit diagnostics data to the device, wherein the diagnostic data indicates an error of the IHS; and perform an over the air repair of the error via the communication session.

2. The IHS of claim 1, wherein the computer-readable instructions to cause the IHS to receive and decode the first packet includes computer-readable instructions to cause the IHS to: receive and decode an AUX_ADV_IND protocol data unit (PDU) that includes the channel and timing offset information.

3. The IHS of claim 1, wherein the computer-readable instructions to cause the IHS to receive and decode the second packet includes computer-readable instructions to cause the IHS to: receive and decode an AUX_SYNC_SUBEVENT_IND PDU that includes the first unique identifier.

4. The IHS of claim 3, wherein the computer-readable instructions to cause the IHS to transmit the third packet includes computer-readable instructions to cause the IHS to: transmit the third packet in a response slot that is associated with the AUX_SYNC_IND PDU.

5. The IHS of claim 3, wherein the computer-readable instructions to cause the IHS to transmit the third packet includes computer-readable instructions to cause the IHS to: transmit the third packet having an AUX_SYNC_SUBEVENT_RSP PDU.

6. The IHS of claim 3, wherein the computer-readable instructions to cause the IHS to receive and decode the second packet includes computer-readable instructions to cause the IHS to: parse the second packet to identify the first secure data element.

7. The IHS of claim 3, wherein the computer-readable instructions to cause the IHS to receive and decode the second packet includes computer-readable instructions to cause the IHS to: parse the second packet to identify the first secure data element wherein the first secure data element comprises a text string derived from a unique identifier of the IHS.

8. The IHS of claim 3, wherein the computer-readable instructions to cause the IHS to receive and decode the second packet includes computer-readable instructions to cause the IHS to: parse the second packet to identify the first secure data element wherein the first secure data element comprises a secure code that is different from a unique identifier of the IHS, the IHS further comprising computer-readable instructions to cause the IHS to:

receive another secure code via a user input device of the IHS; and verify the first secure data element by comparing the secure code and the another secure code.

9. The IHS of claim 3, wherein the computer-readable instructions to cause the IHS to receive and decode the second packet includes computer-readable instructions to cause the IHS to: parse the second packet to identify the first secure data element wherein the first secure data element comprises a secure code that is different from a unique identifier of the IHS, the IHS further comprising computer-readable instructions to cause the IHS to:

retrieve another secure code from either the memory or another memory of the IHS; and verify the first secure data element by comparing the secure code and the another secure code.

10. The IHS of claim 1, wherein the computer-readable instructions to cause the IHS to verify the first secure data element comprises computer-readable instructions to cause the IHS to: compare the first secure data element to a second secure data element and determine that the first secure data element matches the second secure data element.

11. The IHS of claim 10, further comprising computer-readable instructions to cause the IHS to:

receive the second secure data element by reading from either the memory or another memory of the IHS.

12. The IHS of claim 10, further comprising computer-readable instructions to cause the IHS to:

receive the second secure data element from user input of a user interface device of the IHS.

13. The IHS of claim 1, wherein the computer-readable instructions to cause the IHS to transmit the third packet comprises computer-readable instructions to cause the IHS to: indicate a successful verification in the third packet.

14. The IHS of claim 1, wherein the computer-readable instructions to cause the IHS to transmit the third packet comprises computer-readable instructions to cause the IHS to: initiate a pairing operation with the device.

15. A non-transitory computer-readable storage device having instructions stored thereon for establishing secured communication with an information handling system (IHS), wherein execution of the instructions by one or more processors of the IHS causes the one or more processors to:

receive and decode a first packet by the transceiver, the first packet including channel and timing offset information for a second packet in an AUX_ADV_IND protocol data unit (PDU);

receive and decode the second packet according to the channel and timing offset information from the first packet, wherein the second packet includes a verification code in an AUX_SYNC_SUBEVENT_IND PDU;

verify the verification code;

in response to verifying the verification code, transmit a third packet via the transceiver to a device associated with the first packet and the second packet, wherein the third packet has an AUX_SYNC_SUBEVENT_RSP PDU;

subsequent to transmitting the third packet, pair the IHS with the device;

subsequent to pairing with the device, establish a communication session to transmit diagnostics data to the device, wherein the diagnostic data indicates an error of the IHS; and perform an over the air repair of the error via the communication session.

* * * * *